(12) United States Patent
Dow

(10) Patent No.: US 7,464,383 B1
(45) Date of Patent: Dec. 9, 2008

(54) DYNAMIC DEPENDENCY GRAPH IN MVC PARADIGM

(75) Inventor: Gordon B. Dow, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/293,737

(22) Filed: Apr. 16, 1999

(51) Int. Cl.
*G06F 3/00* (2006.01)
*G06F 12/00* (2006.01)

(52) U.S. Cl. ...................... 719/316; 707/201
(58) Field of Classification Search ......... 345/761–765, 345/781, 418–689; 715/501–866, 762–763, 715/511; 707/201, 1–10, 101–104.1, 203; 717/104–113, 170; 719/316–317, 328; 703/2, 703/13
See application file for complete search history.

(56) References Cited

U.S. PATENT DOCUMENTS

| | | | | |
|---|---|---|---|---|
| 5,251,290 A | * | 10/1993 | Pabon | 345/420 |
| 5,404,428 A | * | 4/1995 | Wu | 345/619 |
| 5,469,538 A | * | 11/1995 | Razdow | 345/440 |
| 5,526,475 A | * | 6/1996 | Razdow | 715/538 |
| 5,537,593 A | * | 7/1996 | Diamond et al. | 719/313 |
| 5,689,711 A | * | 11/1997 | Bardasz et al. | 717/105 |
| 5,808,625 A | * | 9/1998 | Picott et al. | 345/440 |
| 5,815,415 A | * | 9/1998 | Bentley et al. | 703/4 |
| 5,929,864 A | * | 7/1999 | Picott et al. | 345/440 |
| 6,128,771 A | * | 10/2000 | Tock et al. | 717/1 |
| 6,272,672 B1 | * | 8/2001 | Conway | 717/107 |
| 6,292,804 B1 | * | 9/2001 | Ardoin et al. | 707/102 |
| 6,505,228 B1 | * | 1/2003 | Schoening et al. | 709/106 |

OTHER PUBLICATIONS

Krasner et al., "A Cookbook for Using the Model-View-Controller User Interface Paradigm in Smalltalk-80", JOOP Aug./Sep. 1988, pp. 26-49.
"Model View Controller", www.object-arts.com/EducationCentre/Overviews/MVC, 2 pgs., Dec. 10, 1998.
"Pattern: Observer", www.object-arts.com/EducationCentre/Patterns/Observer, 2 pgs., Dec. 10, 1998.
"Pattern: Model-View-Presenter", www.obect-artscom/EducationCentre/Paterns, 2 pgs., Dec. 10, 1998.
"Pattern: Basic MVP Component", www.obect-artscom/Educati...tre/Paterns/BasicMVPComponent, 3 pgs., Dec. 10, 1998.
"Pattern: Basic MVP Component", www.obect-artscom/Educati.../Paterns/Composite, 3 pgs., Dec. 10, 1998.

(Continued)

*Primary Examiner*—Meng-Ai An
*Assistant Examiner*—Charles E Anya
(74) *Attorney, Agent, or Firm*—Fish & Richardson P.C.

(57) ABSTRACT

Apparatus and methods for maintaining dependencies among a set of objects in a computer program. Object dependencies are recomputed dynamically when settable object values are changed. Observer-only objects are enqueued for synchronization when marked as invalid. A synchronization process recomputes dependent object values, in the course of which recomputation object dependencies are established according to current object values.

36 Claims, 4 Drawing Sheets

OTHER PUBLICATIONS

"Model-ID View-DC Controller", www.cs.nwu.edu/academics/courses, 2 pgs., Dec. 10, 1998.

"Model-View-Controller", www.kinetica.com/ootips/mvc-pattern, 3 pgs., Dec. 10, 1998.

"Applications Programming in Smaltalk-80™: How to use Model-View-Controller (MVC)", www.cs.uiuc.edu/users/smarch/st-docs, 10 pgs, Dec. 10, 1998.

"Creating Re-usable Definitions", http://atddoc. cern.ch/Atlas/Notes/004/Note004-10, 3 pgs., Dec. 10, 1998.

* cited by examiner

DYNAMIC DEPENDENCY GRAPH IN MVC PARADIGM

MICROFICHE APPENDIX

This application includes, as Appendix A, a microfiche appendix titled "Appendix A—Microfiche of Source Code", having one fiche with a total of 43 frames.

The foregoing portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to dependency management among computer program objects representing application state.

The Model-View-Controller ("MVC") paradigm of object-oriented programming exploits the observation that certain objects model user abstractions, other objects create views (projections) of those objects, and still others manipulate objects, perhaps through views. It has also been observed that model-view relationship can be understood in terms of subject and observer roles and that an object might have the role of subject in one relation and of observer in another.

Many solutions exist for the problem of keeping a dependent state consistent (i.e., synchronized) with the state upon which it depends. Traditional notification mechanisms require observers to register explicitly with their subject a callback routine of some sort, in which an observer is notified of a change to a piece of state on which it depends and recomputes its own state accordingly. Lazy-update mechanisms also exist, where dependents are simply dirtied and subsequently re-synchronized as well.

SUMMARY OF THE INVENTION

The invention provides methods and apparatus, including systems and computer program products, implementing techniques managing computer program state. In one aspect, the invention provides techniques for maintaining dependencies among a set of objects in a computer program. In another aspect, the invention provides techniques for changing objects having values defining state of a computer program application. In another aspect, the invention provides techniques for providing a dependency management system for managing application state in a consistent manner.

In advantageous implementations, the techniques include one or more of the following features. In operation, the technique can include recomputing the value of object A, wherein when the value of object A is a function of the value of object B and the value of object B changes, marking object A as dirty and not recomputing the value of object A until object A is queried for a value; recomputing the value of object B, wherein when the value of object B changes, invalidating the dependents of object B and all of their further dependents, including severing dependencies among the dependents of object B and all of their further dependents; and causing each invalidated observer-only object to recompute its value by querying the values of the objects from which the observer-only object depends. The technique can include identifying the objects upon which a given object depends as those objects into which the given object passed itself as a requester during execution of a compute method of the given object; and means for marking the given object as dirty whenever the value of any one of the identified objects changes and not recomputing the value of the given object until the given object is queried for a value. The technique can include using a requester object to make each of an operation's queries; and establishing a requester-object relationship with each object whose value is available to be queried by the operation; wherein if the value of any of the one or more objects is unavailable to be read by the operation, then interrupting the operation, terminating all of the operation's requester-object relationships, and then retrying the operation.

The technique can also include receiving a change to a value of a changed object, the changed object being a settable object in the application; registering the change with a transaction; and dirtying all objects dependent (directly or indirectly) on the changed object; wherein whenever a leaf object is encountered as a dependent object, the leaf object is enqueued for synchronization after the transaction is committed. The technique can also include creating a transaction registering with the transaction one or more changes to settable objects, each change being made to a corresponding changing object; traversing a dependency graph, for each change registered, from the changing object and (i) for each dependent object on the dependency graph, marking the dependent object as dirty and detaching the dependent object from the dependency graph, and (ii) accumulating each leaf object encountered in traversing the dependency graph in a strobe queue; and traversing the strobe queue after all changes to settable objects have been registered and synchronizing each leaf object by recomputing values for objects marked as dirty and rejoining recomputed objects with the dependency graph, whereby leaf objects are rejoined with the dependency graph. The technique can also include calculating the dependency among objects in the set dynamically at the time objects calculate their values. The technique can also include providing a VValue class for objects having values representing application state; and providing in VValue objects a handleRequest method that, when executed, causes an object A to be identified in a dependents list for an object B, the dependents list identifying all objects whose value is a function of the value of VValue object B.

Advantages that can be seen in implementations of the invention include one or more of the following. The invention can be used to implement a runtime architecture in which an invalidation protocol is integrated with update dependency management in a uniform protocol which is (otherwise) invisible to the programmer using the runtime architecture. Dependencies do not have to be managed explicitly by a programmer using the architecture, thereby avoiding one source of errors. Recomputations do not occur against an inconsistent picture of application state. Even when a single user interface element or intermediate computation depends upon the value of many different pieces of application state, a single change which should be treated atomically is in fact treated atomically, without redundant computations of the same entity.

The details of embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The methods, apparatus, and computer programs of the invention can be used to provide a threadsafe, transaction-based dependency management system for managing application state in a consistent manner, and in particular for managing the display of application state in a GUI (graphical user interface) in a consistent manner. The embodiment that will be described is a Java language implementation of a runtime architecture to support computer programs written in the Java language. The implementation includes the following Java classes and interfaces: VValue, VStrobe, Requester, Transaction, VObserver, Vchange, Transactor, and VSynchronizer, source code for which is provided in Appendix A. The elements and operation of the architecture will be described after the following introductory remarks.

The runtime architecture can be used to represent the complete runtime state of an application as a function of user actions, contents of the file system, and other pieces of external state. For example, for a document viewer application, the settable aspects of a window can include the file being viewed, the current zoom level, the current page mode, and so on.

An executing computer program application can be thought of as a collection of pieces of state organized hierarchically. Application state is affected by the user's actions and interapplication communication, and manifested in screen display, output files, and general application behavior. The path from user actions to display generally wends its way through a complex, hierarchical organization of computed state.

There generally exists state within an application whose value is set directly by user actions. For example, when the user types a URL or a file name into a dialog box, a document-source reference value is set to that value. When the user enters a value into a "set zoom level" dialog, a "user-requested zoom level" reference value is set to that value. This kind of state will be application called settable. Other state generally exists whose value is computed from, or dependent on, one or more other pieces of state within the application. Dependent state may depend on both settable state and other dependent state. Dependent state is not necessary for the correct operation of an application, but it is useful to avoid wasteful repetition of computation.

In the runtime architecture, the representation state includes objects and object dependencies. Objects that use (and therefore query) the value of other objects to compute their own value are dependent on those other objects. Settable objects are not dependent. When the value of an object changes, the dependent objects are notified that their state may be affected and marked as dirty. All then-current dependencies are severed in this recomputation of state, and new dependencies are established in the later process of recomputing the dependent objects' values.

Figure 1A:
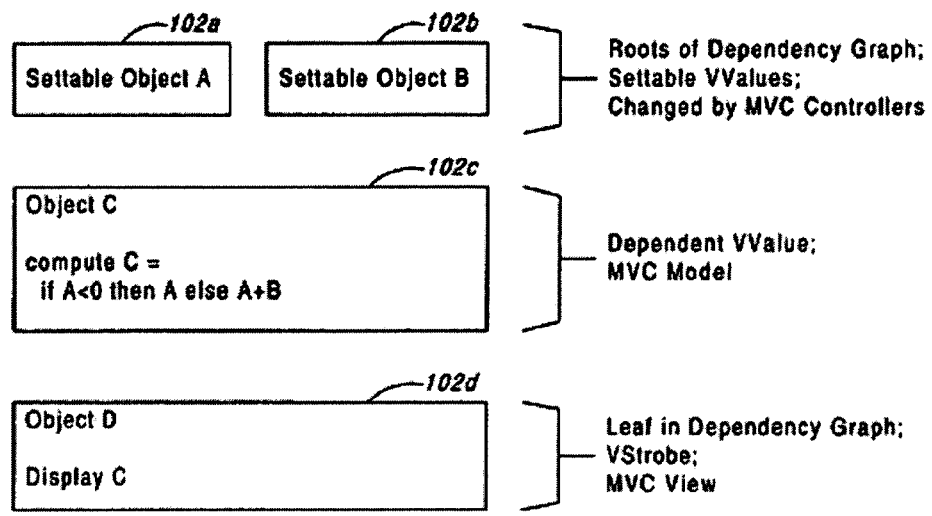
FIGS. 1A, 1B, 1C, and 1D (collectively referred to as FIG. 1) illustrate elements of a runtime architecture in accordance with the invention.
Figures 1B, 1C:
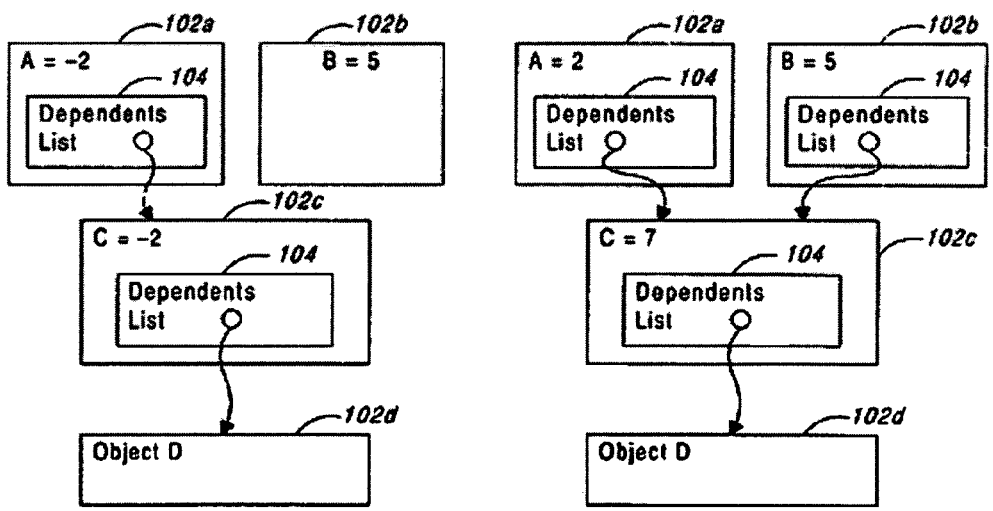
Figure 1D:
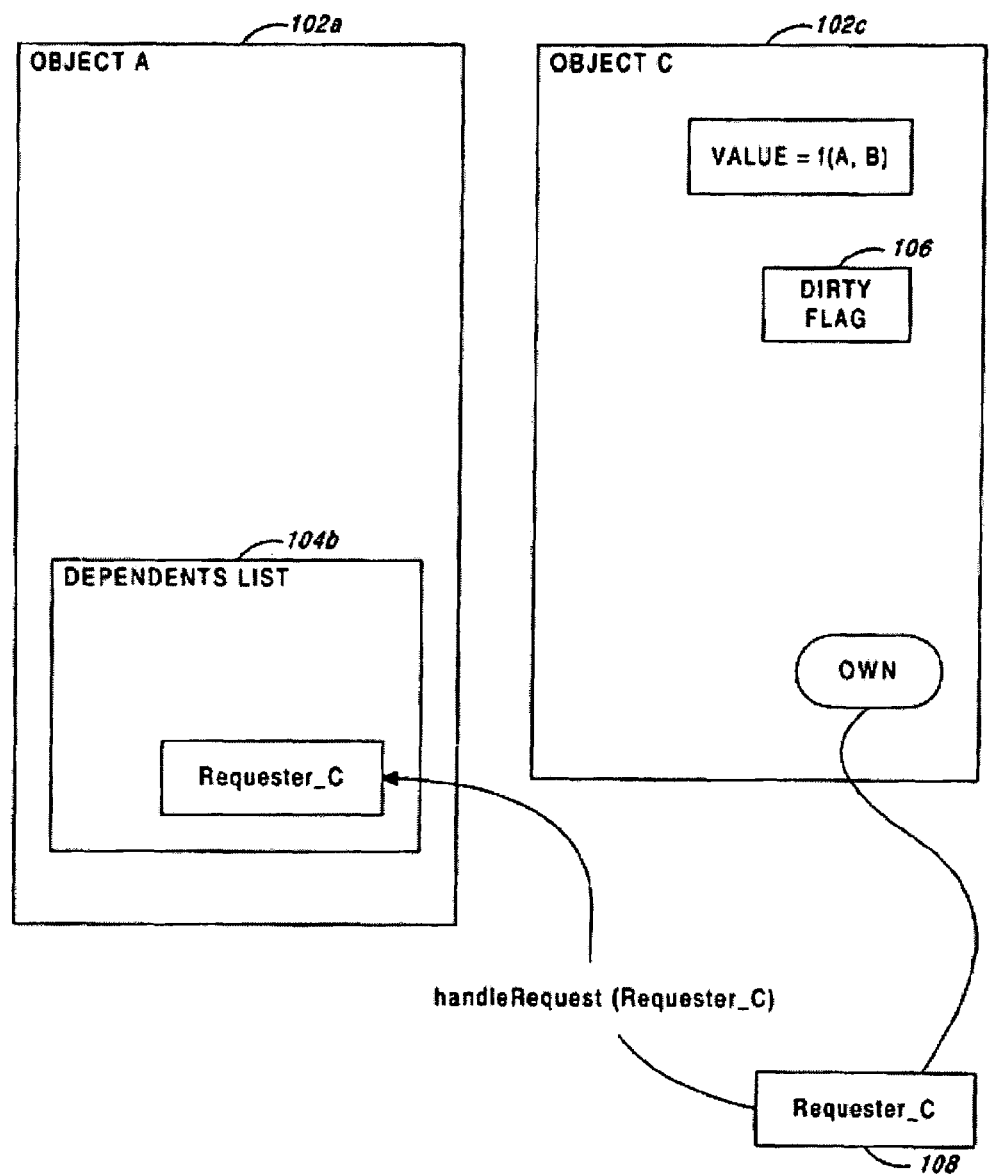

FIG. 1 (collectively, FIGS. 1A, 1B, 1C, and 1D) shows a simple example illustrating attributes and relationships of objects that have been and will be mentioned in this specification. Two objects, object A 102a and object A 102b are settable objects. As noted on FIG. 1A, in the MVC paradigm, these are controllers or set by controllers. In the dependency graph maintained by the runtime system, these will always be roots. Object C 102c is a dependent object because its value is a function of the values of objects A and B, shown in FIG. 1A as C=if (A<0) then A else (A+B)

and in FIG. 1D as

C=f(A,B).

Whether an object is valid is recorded in a dirty flag 106. As will be described, the dependencies are maintained dynamically. FIGS. 1B and 1C show two different dependency graphs: the former arises when object A has a value less than zero (a value of −2 is shown); the latter, otherwise (a value of 2 is shown). The dependencies are maintained in a dependents list 104, which is non-empty in each object that has dependents after all values are recomputed.

The process of querying a dependent value involves first verifying that it is valid and revalidating it if necessary. All affected values and only affected values are recomputed. As a result, value dependencies are automatically established as a natural consequence of computing an object's state. The runtime architecture thus integrates an invalidation protocol with update dependency management in a uniform protocol that is (otherwise) invisible to the programmer using the architecture.

The architecture defers the computation of dependent values until the values are actually required. The mechanism is fully general. Dependent objects maintain a flag 106 that determines whether they are valid or invalid (dirty). A change in an object's value does not cause its dependents to be recomputed; instead, as has been mentioned, the dependents and all of their further dependents are simply invalidated. At certain well-defined points, invalidated observer-only objects are notified to recompute their values. The observer-only objects query the values of the objects they need to compute their own values and in the process establish new dependencies.

Figure 2:
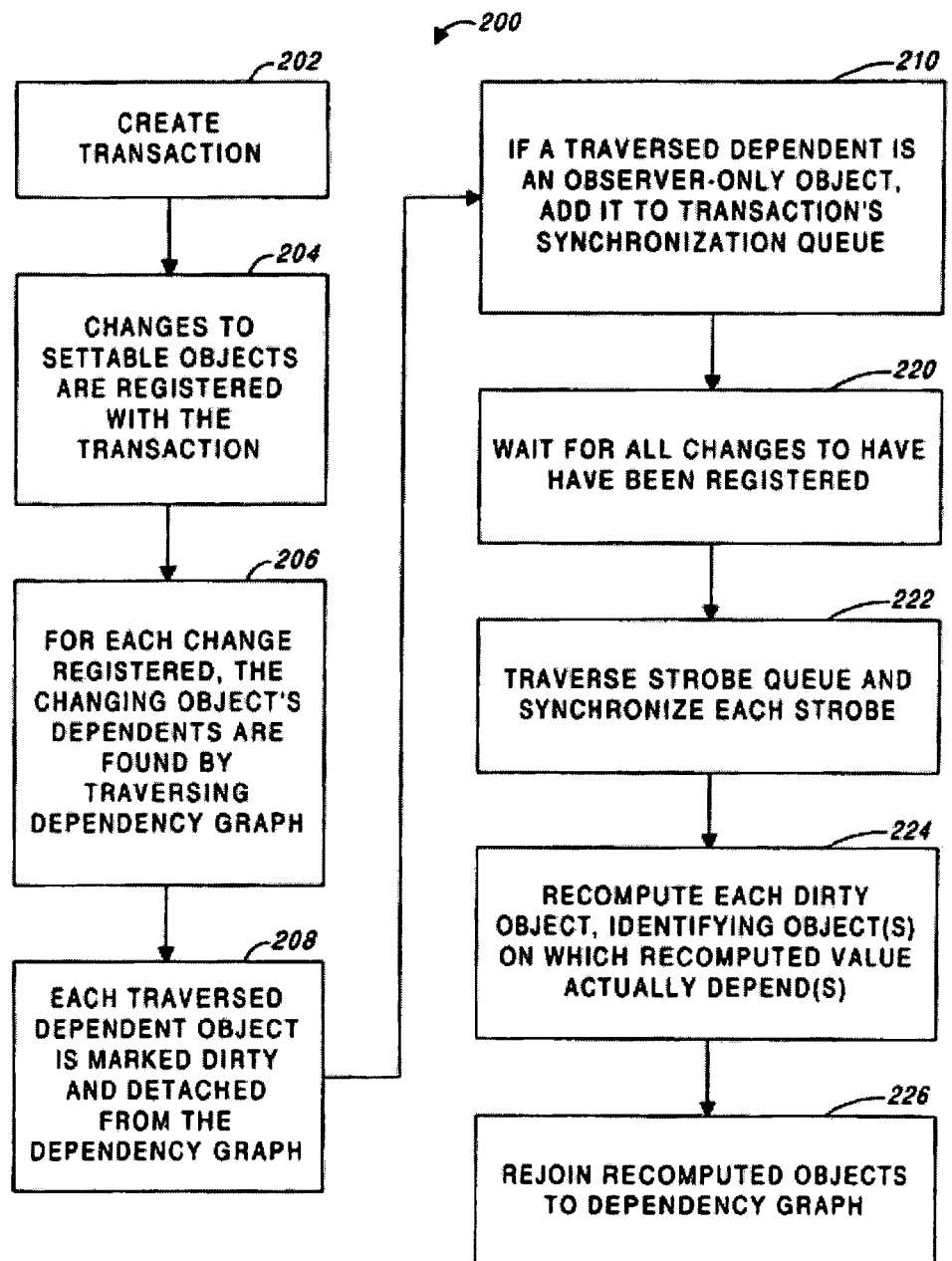
FIGS. 2 and 3 are flowchart of processing operations in accordance with the invention.

As illustrated in FIG. 2, a transaction is a set of one or more changes to one or more settable objects. To perform a transaction 200, the following steps occur. A transaction is created (step 202). One or more changes to settable objects are registered with the transaction (step 204). For each change registered, the dependents of the object to be changed are found by traversing the dependency graph (step 206). Each found object is dirtied and detached from the dependency graph (step 208). The leaves of the graph are observer-only objects, that is, objects whose values are not used to compute the values of any other objects. When an observer-only object is encountered in the traversal, it is accumulated in the transaction's synchronization queue (step 210). (The observer-only objects or "leaves" of the graph are also referred to in this specification as "strobes". See also FIG. 1) When all the changes in the set have been registered (step 220), the synchronization queue (also called the strobe queue) is traversed, each strobe is recomputed, and all the strobes are synchronized as a result (step 222). During synchronization, the values of one or more objects are queried. Dirty objects are recomputed (step 224) and, as a side effect, rejoined with the dependency graph (step 226). In this way, the strobe is rejoined with the dependency graph through these queries.

As has been mentioned, the present implementation of the runtime architecture includes the following Java classes and interfaces: VValue, VStrobe, Requester, Transaction, VObserver, Vchange, Transactor, and VSynchronizer, A VValue is a formalized, live, notifying reference to a value that may change during the application's lifetime. Application state, at some granularity or another, is represented by VValues. All VValues are either settable or dependent. During the computation of a VValue's value, it is impossible for the value of another VValue on which this VValue's value depends to change. In FIG. 1, objects A, B, C, and D are VValues. (As is customary, terms like "VValue" will be used to refer both to an object of a class and to the class itself, the meaning being clear from the context.)

A settable VValue is either settable or preset; its value is determined from outside the dependency graph, perhaps as a direct result of a user action.

A dependent VValue computes its value based on the values of other VValues, which may themselves be either settable or dependent. A dependent VValue has a compute method that computes its value based on the values of one or more other VValues. A settable VValue does not.

A dependency graph is used to represent application state. The dependency graph constantly changes during execution of an application, and all VValues are arranged in the dependency graph with the settable VValues as the roots. This is illustrated by the difference between links from the dependents lists 104 in FIGS. 1B and 1C.

A Transaction is a set of changes to one or more settable VValues. User events translate roughly into Transactions.

A VObserver is a Java interface used to handle the display of the application. VObserver is implemented by such entities as menu items, push buttons, and generally any other display components whose contents are affected by the values of VValues.

VStrobe is a subclass of VValue. VStrobes are the leaf nodes of the dependency graph. Since VObserver is an interface and VValue is a class, VObservers are connected to the dependency graph by VStrobes. In FIG. 1, object D 102d is a VStrobe.

A VObserver implements a change method within which values are queried and the user interface is updated. This change method is called whenever a Transaction is committed that has changed some VValue upon which the VObserver's VStrobe depends, directly or indirectly.

An operation is a set of queries of VValue values. A VObserver's change method is an operation because it queries VValue values. A Transaction is an operation because the set of changes accumulated into a Transaction may be a function of pre-Transaction state, (consider, for example, a "go to next page" Transaction).

An operation is consistent if the following two conditions are satisfied. First, any two queries in the operation of the value of the same VValue return the same result, unless the operation itself changed the VValue's value, in which case that value is returned. Second, if a VValue A is dependent upon a VValue B, directly or indirectly, and both are queried, the value returned by B is the value of B that was used in the computation of the value of A. Consistency of operations is highly desirable. If screen display is required to be consistent, the change operation must be consistent. Because VValues can be used by VStrobes to cache the results of computations, VValue value computations must be consistent. Because the same VValue can be queried twice during an operation, Transactions must be consistent.

Requester is a class used to make operations consistent. When a Requester requests a VValue's value, that VValue cannot change until the Requester terminates, at which time all VValues whose values were requested by the Requester are released. A VValue's value cannot change unless it has zero active Requesters. In FIG. 1D, a Requester is illustrated as Requester_C 108.

Transactions descend from the Requester class. Transaction is a subclass of Requester so that, during the execution of a Transaction, it is impossible for a queried value to change.

A Transactor object is used to handle deadlock conditions, such as thread deadlocks, between or among operations. A deadlock occurs whenever two operations require conflicting permissions on VValues held by each other. The runtime architecture uses a conservative deadlock detection policy, where if one Transaction requires a resource that another Transaction owns, the one Transaction immediately aborts. Transactors are used to hide the problem of deadlock from the implementer using the runtime architecture. A Transactor has a single buildchanges method that issues a series of changes based on the current state of the dependency hierarchy. When a Transactor's commit method is called, it creates a new Transaction object and executes the buildChanges method. If buildChanges fails because of deadlock, the Transactor simply repeals the changes, waits until the competing Transaction completes, creates a new Transaction, and tries again. Thus, in this implementation, when there is a collision between a change propagating from one operation and a recomputation from another, the writer (dirtying dependent objects) wins and the reader (querying values) loses.

Figure 3:
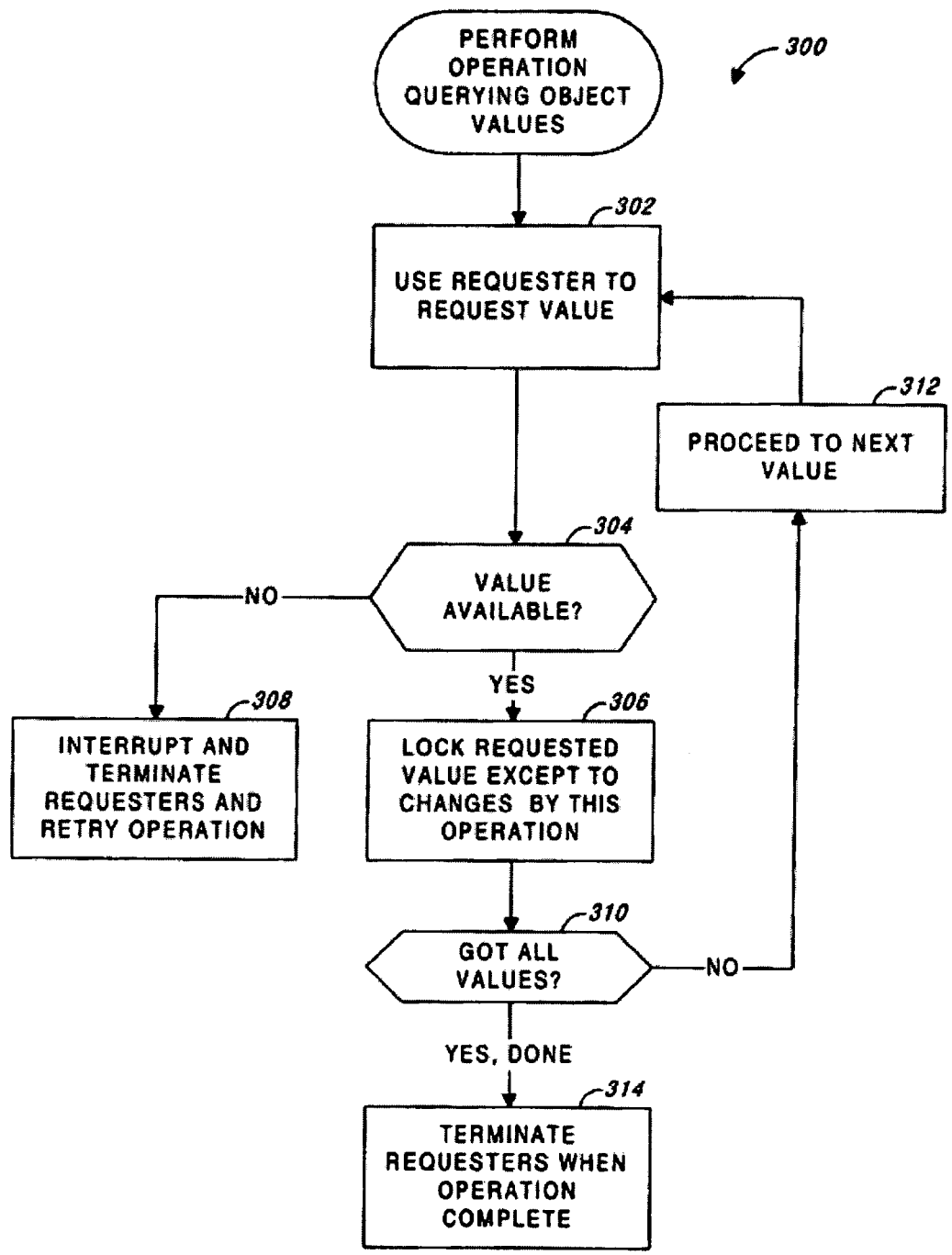

To recapitulate, as shown in FIG. 3, to perform an operation is to make a set of queries of VValue values (process 300). A Requester is used to request the value of each object (step 302). If the value is available (yes branch from decision step 304), the requested value is locked except to requests and changes made by the present operation (step 306). That is, when a Requester requests a VValue's value, that VValue cannot change until the Requester terminates. If the value is not available (no branch form step 304), because the VValue is marked dirty, for example, the operation is interrupted and its Requesters are terminated, to avoid deadlocks, and the operation is tried again later (step 308). The operation continues (if it is not interrupted) until all values have been queried (yes branch of decision step 310, and steps 312 and 302). When the operation is completed, the Requesters are terminated and the locked values are thus released (step 314).

As has been mentioned, a dependency graph is part of the representation of application state. Unless an application has a serious programming error, its dependency graph is directed and acyclic. The roots of the dependency graph are the settable VValues, such as objects A and B (FIG. 1), changes to which are accumulated in a Transaction object. The leaves are VStrobes, such as object D (FIG. 1). The intermediate nodes are the dependent VValues, such as object C (FIG. 1), whose values are the results of intermediate computations.

The runtime architecture provides a robust, thread-friendly notification mechanism. This mechanism enables third-party developers to integrate new application state seamlessly into a shipping runtime environment.

A programmer wishing to add a feature to an application built using the architecture will consider the following questions. First, what new state is to be introduced into the application? The new state should be represented by the values of one or more settable VValues. Second, what operations should the user, or other clients, be able to perform on the new state? All such operations should be performed by Transactions. Operations that can be handled atomically should take place within Transactors. Third, how is the new state displayed in the user interface? The new state should be displayed in the user interface with objects that implement the VObserver interface. And finally, what useful computations are either expensive or likely to be queried often? These computations should be performed by dependent VValues.

A VValue may be subclassed for one of two reasons: (1) to define the domain of the VValue's values to a particular type and to provide accessor methods for that particular type; and (2) to instantiate dependent VValues whose values are computed in a particular way.

As an example of the first case, a VValue class VTransform might be subclassed to a class Transform defining values of type Transform and providing an accessor method transformValue (Requester requester). Instances of such subclasses, but not their descendants, are settable. As an example of the second case, a VValue class VTransform might be subclassed to a class VTransformProduct, with a constructor VTransformProduct (VTransform t1, VTransform t2), whose value is the calculated product of t1 and t2. Instances of such subclasses are dependent.

To create a VValue whose value is of a particular type, a programmer can perform the following steps.
  (1) Declare a public subclass of VValue of the form VYourType, where YourType is the type of the subclass's value.
  (2) Add a protected constructor method that takes no parameters. This is the constructor that will be used by dependent subclasses of VYourType.
  (3) Add a constructor function that takes an initial value. This is the constructor for settable VValues, and it insures that the settable VValues always have a meaningful value.
  (4) Add an instance variable of the type yourType to store the "current" value.
  (5) Add a compute YourType method which takes no parameters and throws a ComputeSettableException. Implementers of dependent subclasses of VYourType will override this method.
  (6) Override VValue's compute method, and set the "current" value to the result of computeYourType. Make the new compute method final.
  (7) Add an accessor method named yourTypeValue(Requester requester). Clients will call this to get the current value of this VYourType.
  (8) Add a value-setting method named setYourTypeValue (Transaction t, yourType newValue).

An example is the implementation of VDimension shown in the following table. Vdimension is a VValue descendant that is a reference to a java.awt.Dimension object.

/**
* VValue descendant representing a value that is a Dimension object.
*/
import java.awt.Dimension;

public class VDimension extends VValue implements DependencyInspectorFriend
{
  /**
  * Create a new dependent VDimension object. Since dependent VValues
  * require a computation method (for VDimension, computeDimension,
  * this constructor is protected.
  */
  protected VDimension( )
  {
  }
  /**
  * Create a new settable VDimension object. Settable VValues require an
  * initial value, which is provided here with the parameter initialVal.
  * @param initialVal the initial value of the VDimension.
  */
  public VDimension(Dimension initialVal)
  {
  dimension=initialval;
  initializeSettable( );
  }
  /**
  * Create a new settable VDimension object whose value is initialized to a
  * Dimension object with the given width and height.
  * @param width the initial width of the VDimension
  * @param height the initial height of the VDimens ion
  */
  public VDimension(int width, int height)
  {
  this(new Dimension(width, height));
  }
  /**
  * Get the current value of this VDimension.
  * @param requester the Requester of the value
  * @return the current value of this VDimension. The value returned will
  * not change before the requester releases this VDimension.
  * @exception java.lang.Exception arbitrary exceptions may be thrown
  */
  public Dimension dimensionValue(Requester requester) throws Exception
  {
  // Call handleRequest to set up the requester-requestee relationship handleRequest(requester);
  // Return the compute value.
  return dimension;
  }
  /**
  * Set the current value of this settable VDimension. A VDimensionChange is created and registered
  * with the Transaction, and the change is applied. Requesters not operating on behalf of the
  * transaction will not be able to query this VDimension's value until the Transaction
  * terminates or calls notifyStrobes.
  * @param t the Transaction with which this change is registered
  * @param newVal the new value of this VDimension
  * @exception WriteLockException if deadlock is detected
  */
  public void setDimensionValue(Transaction t, Dimension newval) throws WriteLockException
  {
  t.registerchange(new VDimensionChange(newVal, this));
  }
  /**
  * VChange subclass for changes to the value of a settable VDimension.
  */
  private class VDimensionChange extends VChange
  {
  /**
  * Create a new VDimensionChange which changes the sets the given
  * VDimension's value to the given new value.
  * @param newValue the new value of this VDimension after this VChange has been applied.

```
* @param oldValue the VDimension doing the changing,
    with its value set to the pre-change value.
* This should be a Dimension object, but some compilers
    fail on the enclosing-instance
* reference in the parameter list of the superconstructor, so
    we just pass it in here.
*/
VDimensionChange(Dimension newValue, VDimension
    oldValue)
{
    super(oldValue);
    this.oldValue=oldvalue.dimension;
    this.newValue=newvalue;
}
/**
* Apply the VDimensionChange to this VDimension.
*/
public void apply( )
{
    VDimension.this.dimension=newvalue;
}
/**
* Restore this VDimension's value to the pre-change value.
*/
public void repeal( )
{
    VDimension.this.dimension=oldvalue;
}
/**
* Decide whether or not this VDimensionChange is a no-
    op.
* Transactions ignore VChanges that return true from this
    method.
* @return true if this VDimensionChange's new value and
    old value are the same
*/
public boolean isNoOp( )
{
    if (newValue=null)
        return (oldValue=null);
    else
        return newvalue.equals(oldValue);
}
/**
* Merge this VDimensionChange into another VDimen-
    sionChange. This implementation assumes
* that firstchange is a VDimensionChange whose changer
    is the same VDimensionChange instance as this
* VDimensionChange's. This method is used to reduce the
    number of changes stored in
* Transactions that apply many changes to a single VDi-
    mension.
* @param firstchange the VChange to which this VChange
    is to be appended.
* @return a VDimensionChange for this VDimension rep-
    resenting a
* change from the old value in firstchange to the new value
    in this VDimensionChange.
*/
public VChange mergeChange(VChange firstchange)
{
    // Create a copy of this VDimensionChange VDimen-
        sionChange   result=new   VDimensionChange
        (newvalue, VDimension.this);
    // Stick the firstChange's old value into the result resul-
        t.oldValue=((VDimensionChange) firstChange).old-
        Value; return result;
}
/**
* The new value of this VDimension after this VDimen-
    sionChange
* is applied.
*/
private Dimension newvalue;
/**
* The old value of this VDimension before this VDimen-
    sionChange
* was applied.
*/
private Dimension oldvalue;
}
/**
    Compute the value of this dependent VDimension. This
method simply calls computeDimension
* to set the value instance variable to the computed current
value.
* @param requester the Requester to use when making
queries.
* @exception java.lang.Exception arbitrary exceptions
may be thrown
*/
protected final void compute(Requester requester) throws
Exception
{
    dimension=computeDimension(requester);
}
/**
* Compute the value of this dependent VDimension.
Implementers of dependent VDimension
* subclasses must override this method. This method
should query the values of other VValues,
* passing this VDimension for the Requester parameter.
For example, a VDimension
* might represent the sum of two other VDimensions with
the following implementation
* (assume vA and vB are instance variables):
*
* Dimension a=vA.dimensionValue(this);
* Dimension b=vB.dimensionValue(this);
* return new Dimension(a.width+b.width, a.height+
b.height);
*
* The default implementation of computeDimension
throws a ComputeSettableException.
* @param requester the Requester to use for querying
values.
* @return the current value of this VDimension
* @exception ComputeSettableException if the imple-
menter neglected to
* implement computeDimension
* @exception java.lang.Exception arbitrary exceptions
may be thrown in
* descendant classes' implementations
*/
protected   Dimension   computeDimension(Requester
requester) throws Exception
{
    throw new ComputeSettableException( );
}
/**
* The current value of this VDimension.
/*
Dimension dimension;
//DEBUG
```

```
/**
 * DependencyInspectorFriend method. Return a String
describing the aspect
 * of this VDimension specified by the selector parameter.
 * @param selector the DependencyInspectorFriend con-
stant specifying the kind of information
 * requested about this VDimension (short description, long
description, current value)
 * @return a description String for this VDimension
 */
public String getInfo(int selector)
{
if (selector == DependencyInspectorFriend.kValue)
    return dimension == null ? "null" "("+dimension.width +",
        "+dimension.height +")";
else
    return super.getInfo(selector);
}
// END DEBUG
}
```

To create a descendant of a domain-defining VValue (say, VFooType) whose value is a function of some other piece of runtime state, a programmer can perform the following steps.

(1) Declare a public subclass of VFooType.
(2) Add a constructor function that takes a set of computation parameters that can be used to compute this object's value. The computation parameters should be stored in instance variables in the object.
(3) Override the computeFooTypeValue method which computes the current value of the instance based on its computation parameters, passing the VFooType object itself as the requester for any values.

An example is the VDimension subclass called VRectangleSize, whose value is the size of a given VRectangle, shown in the following table.

```
import java.awt.Dimension;

public class VRectangleSize extends VDimension
{
    /**
     * Create a new VRectangleSize object whose value is the
size of the given VRectangle object.
     * @param r the VRectangle from whose size this VRect-
angleSize's value
     * is derived
     */
    public VRectangleSize(VRectangle r)
    {
        this.r=r;
    }
    /**
     * The VRectangle from whose value this VDimension's
size is computed.
     */
    private VRectangle r;
    /**
     * Compute method for this dependent VDimension. The
implementation of this
     * method for VRectangleSizes simply gets the VRectan-
gle's current value
     * and returns that Rectangle's size.
     * @return the correctly computed current value of this
VRectangleSize
     * @exception java.lang.Exception arbitrary exceptions
may be thrown
     */
    protected final Dimension computeDimension(Requester
requester) throws Exception
    {
        // get the rectangle's value
        Rectangle rval=r.rectangleValue(requester);
        return new Dimension(rval.width, rval.height);
    }
}
```

The above example illustrates how dependencies are maintained. The value of a VRectangleSize object is a function of the value of the VRectangle object that was provided in its construction. To maintain the VRectangleSize object's value properly and to notify observers when the value changes, the VRectangle object upon which the VRectangleSize object depends must be able to notify the VRectangleSize object whenever the VRectangle object changes.

This dependency is established inside computeDimension, in the call to rectanglevalue ( ) where the Requester is passed in. Note that in the VDimension example the invocation of dimensionValue (foo) results in a call to handleRequest (foo); rectanglevalue (foo) does the same thing handleRequest ( ) is a VValue method that adds the Requester to a list that will eventually become the requested VValue's dependents list, thereby insuring that the requesting VValue gets recomputed the next time the requested value changes. This relationship is illustrated in FIG. 1D, which shows that Requester_C 108 becomes part of object A's dependents list 104*b* through a call to the handleRequest( ) method of object A. The dependency link is made to object A because object A owns Requester_C.

Note that, for a given VValue (although not in the above example), the set of observed values is not fixed. If one wished to implement a VInt whose value was the number of VNodes in a VTree object, the VInteger would wind up traversing the VTree, observing the child count of each VNode it encounters. The particular set of VNodes encountered in a given traversal is not necessarily the same each time. In any case, the set of notifiers upon which a given VValue depends is the transitive closure of the set of objects into which that VValue passed itself as a Requester during its compute method. This lazy dependency management saves implementers the trouble of explicitly determining their dependencies.

In the implementation being described, VValues are threadsafe. VValues use Transactions to guarantee the following two invariants: (1) when a VValue is changed, all VObservers in the dependency hierarchy below the VValue will have their changeO methods invoked and completed before any VValue upon which they depend (directly or indirectly) can change; and (2) for each VValue queried from within a VValue's compute method, neither that VValue, nor any VValue in its dependency ancestry, will change until after the completion of the compute method. Any attempt by any thread to change a value under any of the above conditions will block until such time as it is legal to change the value.

VValues recompute lazily, that is, they do not compute their new values until they are requested. When a VValue upon which another VValue depends changes, the observing VValue is merely marked as dirty and not recomputed until queried, at which time dependencies are also re-established. As a result, most computations are invoked directly or indirectly from a VObserver's change method.

VValue values may be controlled and used by "external" entities, such as Abstract Windowing Toolkit (AWT) Components. (AWT is Java's platform-independent, windowing, graphics, and user-interface toolkit.) Non-VValues may be notified of changes to the values of VValues by implementing the VObserver interface, which is defined in the following table.

public interface VObserver
{
/**
 * Respond to a change in value of some VValue that this VObserver queried the last time change( ) was
 * invoked. Implementer s should override this method to query values from the VValue hierarchy and have
 * the results reflected in the user interface. Queries should pass this VObserver's VStrobe as the requester.
 * @param requester the Requester to use in querying values
 * @exception WriteLockException if deadlock is detected
 */
public void change(Requester requester) throws WriteLock-Exception;
}

Non-VValues may be tied into the VValue hierarchy in the following two ways: (1) a non-VValue may change the value of a settable VValue (but never a dependent one), and (2) a non-VValue may wish to change some state in response to a change in a VValue's value.

It is very simple for an external entity to change the value of a settable VValue. The code snippet in the following table implements VIntTextField, a TextField subclass that displays a user-changeable value for a VInt object.

import java.awt.TextField;

public class VIntTextField extends TextField implements ActionListener
{
/**
 * Create a new VIntTextField associated with the given VInt.
 * @param vInt the VInt whose value is set by this VInt-TextField.
 * Note that vInt MUST be settable!
 */
public VIntTextField(VInt vInt)
{
this.vInt=vInt;
addActionListener(this);
}
/**
 * The VInt whose value is set by and displayed in this VIntTextField
 */
private VInt vInt;
/**
 * The user hit "enter." Flush the value in the text field into the VInt.
 */
public void actionPerformed(ActionEvent evt)
{
setNumberFromText( );
}
/**
 * Get the value in the text field, convert it to an integer, and
 * set the associated VInt.
 */
private void setNumberFromText( )
{
int newInt;
Transaction t=new Transaction( );
try
{
   t.begin(null); //No associated TransactionExecution-Context in this simple example
   newInt=Integer.parseInt(getText( ));
   vInt.setIntValue(t, newInt); // Set the integer value
}
catch (Exception e)
{
   t.abort( ); // Undo any damage we may have done
   // failure handling left as an exercise to the reader
   return;
}
finally
{
   // This does nothing if the Transaction has already been
   // aborted by an Exception
   t.finish( );
}
}
}

One may create external objects that respond to changes in VValue state.

A VStrobe object is a proxy object that maintains the state necessary to occupy a place in the VValue dependency hierarchy. Implementers of VObserver must instantiate a VStrobe of their own. For example, the code in the following table implements a VIntLabel which is a subclass of Label that always displays the value of a given VInt.

import java.awt.Label;

public class VIntLabel extends Label implements VObserver
{
/**
 * Create a VIntLabel which always displays the given VInt.
 * @param vInt the VInt displayed in this VIntLabel. Note that
 * it does not matter whether this VInt is settable or dependent.
 */
public VIntLabel(VInt vInt)
{
this.vInt=vInt;
// create and attach to the strobe
strobe=new Vstrobe( );
// register as an observer of the strobe. This function calls change( ),
// which starts us out in the correct state and sets up the
// correct dependencies.
strobe.addObserver(this);
}
/**
 * The VInt being displayed in this VIntLabel.
 */
private VInt vInt;
/**
 * The VStrobe associated with this VIntLabel. This object is part of
 * the VValue dependency hierarchy.
 */
private VStrobe strobe;
 * Get the VStrobe associated with this VIntLabel.
 * @return this VIntLabel's VStrobe
 */
public VStrobe getStrobeo

```
{
return strobe;
}
/**
 * A change has occurred in one of the values queried the
last time change( ) was called
 * on this VIntLabel. Synchronize the VIntLabel's display
with the current state of the universe.
 * @param requester the Requester to use when querying
values.
 * @exception WriteLockException if deadlock is detected
 */
public void change(Requester requester) throws Write-
LockException
{
try
{
    // Get the current value. Pass the VStrobe as the requester
    int value=vInt.intValue(strobe);
    // Convert to a String
    String newText=Integer.toString(value);
    // Set the text value
    setText(newText);
}
catch (WriteLockException w/e)
{
    // Always re-throw WriteLockExceptions; the system
      knows how to
    // deal with these. This VObserver will eventually get
    // synchronized again automatically.
    throw w/e;
}
catch (Exception e)
{
    // Something else went wrong in the computation of the
      vInt's
    // value. The user should be notified.
    System.out.println("Could not display value:" +e.to-
      String( ));
    setText(" ");
}
}
}
```

Note that one of the functions of the VStrobe object is to act as the requester on behalf of the VIntLabel, and is as a result passed in to all VValue value-requests.

To illustrate how these features operate together, the example in the following table takes the two classes (VIntLabel and VIntTextField) and displays a simple Java applet that displays two text fields and the greatest common factor of the values in the two text fields.

```
public class GCF extends Applet
{
    public void init( )
    {
    try
    {
        // Initialize a and b to 1
        a=new VInt(1);
        b=new VInt(1);
        // Create a VInt representing the GCF of a and b
        gcf=new VGCF (a, b);
        VIntTextField tf1=new VIntTextField(a);
        VIntTextField tf2=new VIntTextField(b);
        VIntLabel label=new VIntLabel(gcf);
        add(tf1);
        add(tf2);
        add(label);
    }
    catch (Exception e)
    {
        // handle error here
    }
    }
    private VInt a;
    private VInt b;
    private VInt gcf;
}
class VGCF extends VInt
{
    public VGCF(VInt a, VInt b)
    {
    this.a =a;
    this.b=b;
    }
    private VInt a;
    private VInt b;
    private int gcf(int x, int y)
    {
    // Euler's formula
    int r;
    while (true)
    {
        r=x % y;
        if (r==0)
            return y;
        x=y;
        y=r;
    }
    }
    public int computeInt(Requester requester) throws Excep-
tion
    {
    // Get the current values of a and b, passing the VGCF in as
      the requester
    int aval=a.intValue(requester);
    int bval=b.intValue(requester);
    return gcf(aval, bval);
    }
```

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. The elements necessary only for providing threadsafe operation need not be implemented. Other data structures can be used; for example, the information collected in the dependents list need not be stored in a list structure.

What is claimed is:

1. In a computer program, a method for managing dependencies among a first set of objects each having a value, the first set of objects including a first object and one or more second objects depending directly or indirectly on the first object, the one or more second objects including at least one observer-only second object, the method for maintaining dependencies comprising:
   when the value of the first object changes, invalidating the one or more second objects, including severing dependencies among the one or more second objects, the value of each second object only being recomputed when the respective second object is queried for a value; and
   causing each invalidated observer-only second object to recompute its value by querying the values of a second set of objects from which the observer-only second object depends, wherein querying the values of the second set of objects causes invalidated objects in the second set of objects to be recomputed using one or more requester objects, each requester object operating to request an object's value so that the requested value cannot change until the requester terminates, at which time all objects whose values were requested by the requester object are released.

2. The method of claim 1, further comprising:
   providing the first object in a construction of each second object, wherein the value of each second object is a function of the value of the first object that was provided in the construction of the respective second object.

3. The method of claim 1, further comprising:
   providing in the first object a method that adds a requester owned by a second object to a dependents list for the first object, the dependents list identifying all second objects whose value is a function of the value of the first object.

4. The method of claim 3, wherein the dependents lists for all objects in the first set of objects collectively define a directed, acyclic dependency graph.

5. The method of claim 1, further comprising:
   when a second object is invalidated, breaking any dependency relationships the invalidated second object may have had; and
   when the value of an invalidated second object is recomputed, identifying the objects on which the recomputed value is actually dependent and identifying the recomputed second object as dependent only on the identified objects.

6. The method of claim 1, wherein the first set of objects includes settable objects and dependent objects, and each dependent object maintains a flag whose setting marks the dependent object as valid or invalid.

7. A method for changing objects having values defining state of a computer program application, comprising:
   receiving a change to a value of a changed object, the changed object having objects depending directly on the changed object and objects depending indirectly on the changed object through an object different from the changed object, the changed object being a settable object in the computer program application;
   registering the change with a transaction;
   dirtying all objects dependent on the changed object;
   severing dependencies from the changed object and all of its direct and indirect dependent objects; and
   whenever a leaf object is encountered as a dependent object, enqueuing the leaf object for synchronization after the transaction is committed, wherein leaf object synchronization includes using a requester object to make the transaction consistent, the requester object operating to request an object's value so that the requested value cannot change until the requester terminates, at which time all objects whose values were requested by the requester object are released.

8. The method of claim 7, wherein leaf object synchronization comprises:
   recomputing a value for each object marked as dirty, identifying the objects on which the recomputed value is actually dependent, and identifying the recomputed object as dependent only on the identified objects.

9. A method for changing objects defining state of a computer program application, comprising:
   creating a transaction and registering with the transaction one or more changes to settable objects, each change being made to a corresponding changing object;
   for each change registered, traversing a dependency graph from the changing object and (i) for each dependent object on the dependency graph, marking the dependent object as dirty and detaching the dependent object from the dependency graph, and (ii) accumulating each leaf object encountered in traversing the dependency graph in a strobe queue; and
   traversing the strobe queue after all changes to settable objects have been registered and synchronizing each leaf object by recomputing values for objects marked as dirty and rejoining recomputed objects with the dependency graph, whereby leaf objects are rejoined with the dependency graph, wherein the values for objects marked as dirty are recomputed using one or more requester objects, each requester object operating to request an object's value so that the requested value cannot change until the requester terminates, at which time all objects whose values were requested by the requester object are released.

10. The method of claim 9, wherein:
   the dependency graph represents application state;
   the roots of the dependency graph are the settable objects of the application state; and
   the intermediate nodes of the dependency graph are dependent objects whose values are the results of intermediate computations.

11. The method of claim 9, wherein:
the leaf objects of the dependency graph are coupled to a user interface.

12. The method of claim 11, wherein:
the leaf objects are coupled directly to the user interface.

13. A system for managing dependencies among a first set of objects in a computer program, each object having a value, the first set of objects including a first object and one or more second objects depending directly or indirectly on the first object the one or more second objects including at least one observer-only second object, the system comprising: a processor;
means for recomputing the value of the first object, wherein when the value of the first object changes, the one or more second objects are invalidated, including severing dependencies among the one or more second objects, the value of each second object only being recomputed when the respective second object is queried for a value; and
means for causing each invalidated observer-only second object to recompute its value by querying the values of a second set of objects from which the observer-only second object depends, wherein querying the values of the second set of objects causes invalidated objects in the second set of objects to be recomputed using one or more requester objects, each requester object operating to request an object's value so that the requested value cannot change until the requester terminates, at which time all objects whose values were requested by the requester object are released.

14. The system of claim 13, further comprising:
means for providing the first object in a construction of each second object, wherein the value of each second object is a function of the value of the first object that was provided in the construction of the respective second object.

15. The system of claim 13, further comprising:
means for providing in the first object a method that adds a requester owned by a second object to a dependents list for the first object, the dependents list identifying all second objects whose value is a function of the value of the first object.

16. The system of claim 15, wherein the dependents lists for all objects in the first set of objects collectively define a directed, acyclic dependency graph.

17. The system of claim 13, further comprising:
means for breaking any dependency relationships the invalidated second object may have had when a second object is invalidated; and
when the value of an invalidated second object is recomputed, means for identifying the objects on which the recomputed value is actually dependent and means for identifying the recomputed second object as dependent only on the identified objects.

18. The system of claim 13, wherein the first set of objects includes settable objects and dependent objects, and each dependent object maintains a flag whose setting marks the dependent object as valid or invalid.

19. A system for changing objects having values defining state of a computer program application, comprising: a processor;
means for receiving a change to a value of a changed object, the changed object having objects depending directly on the changed object and objects depending indirectly on the changed object through an object different from the changed object, the changed object being a settable object in the computer program application;
means for registering the change with a transaction;
means for dirtying all objects dependent on the changed object; and
means for severing dependencies from the changed object and all of its direct and indirect dependent objects; wherein
whenever a leaf object is encountered as a dependent object, the leaf object is enqueued for synchronization after the transaction is committed, wherein leaf object synchronization includes using a requester object to make the transaction consistent, the requester object operating to request an object's value so that the requested value cannot change until the requester terminates, at which time all objects whose values were requested by the requester object are released.

20. The system of claim 19, further comprising:
for leaf object synchronization, means for recomputing a value for each object marked as dirty, means for identifying the objects on which the recomputed value is actually dependent, and means for identifying the recomputed object as dependent only on the identified objects.

21. A system for changing objects defining state of a computer program application, comprising: a processor;
means for creating a transaction and registering with the transaction one or more changes to settable objects, each change being made to a corresponding changing object;
means for traversing a dependency graph, for each change registered, from the changing object and (i) for each dependent object on the dependency graph, marking the dependent object as dirty and detaching the dependent object from the dependency graph, and (ii) accumulating each leaf object encountered in traversing the dependency graph in a strobe queue; and
means for traversing the strobe queue after all changes to settable objects have been registered and synchronizing each leaf object by recomputing values for objects marked as dirty and rejoining recomputed objects with the dependency graph, whereby leaf objects are rejoined with the dependency graph, wherein the values for objects marked as dirty are recomputed using one or more requester objects, each requester object operating to request an object's value so that the requested value cannot change until the requester terminates, at which time all objects whose values were requested by the requester object are released.

22. The system of claim 21, wherein:
the dependency graph represents application state;
the roots of the dependency graph are the settable objects of the application state; and
the intermediate nodes of the dependency graph are dependent objects whose values are the results of intermediate computations.

23. The system of claim 21, wherein:
the leaf objects of the dependency graph are coupled to a user interface.

24. The system of claim 23, wherein:
the leaf objects are coupled directly to the user interface.

25. A computer program product, tangibly stored on a computer-readable medium, for managing dependencies among a first set of objects each having a value, the first set of objects including a first object and one or more second objects depending directly or indirectly on the first object, the one or more second objects including at least one observer-only second object, the product comprising instructions operable to cause a computer to:
recompute the value of the first object, wherein when the value of the first object changes, the one or more second objects are invalidated, and the dependencies among the one or more second objects are severed, the value of each second object only being recomputed when the respective second object is queried for a value; and cause each invalidated observer-only second object to recompute its value by querying the values of a second set of objects from which the observer-only second object depends, wherein querying the values of the second set of objects causes invalidated objects in the second set of objects to be recomputed using one or more requester objects, each requester object operating to request an object's value so that the requested value cannot change until the requester terminates, at which time all objects whose values were requested by the requester object are released.

26. The product of claim 25, further comprising instructions operable to:

provide the first object in a construction of each second object, wherein the value of each second object is a function of the value of the first object that was provided in the construction of the respective second object.

27. The product of claim 25, further comprising instructions operable to:

provide in the first object a method that adds a requester owned by a second object to a dependents list for the first object, the dependents list identifying all second objects whose value is a function of the value of the first object.

28. The product of claim 27, wherein the dependents lists for all objects in the first set of objects collectively define a directed, acyclic dependency graph.

29. The product of claim 25, further comprising instructions operable to:

break any dependency relationships the invalidated second object may have had when a second object is invalidated; and when the value of an invalidated second object is recomputed, identify the objects on which the recomputed value is actually dependent and identify the recomputed second object as dependent only on the identified objects.

30. The product of claim 25, wherein the first set of objects includes settable objects and dependent objects, and each dependent object maintains a flag whose setting marks the dependent object as valid or invalid.

31. A computer program product, tangibly stored on a computer-readable medium, for changing objects having values defining state of a computer program application, the product comprising instructions operable to cause a computer to:

receive a change to a value of a changed object, the changed object having objects depending directly on the changed object and objects depending indirectly on the changed object through an object different from the changed object, the changed object being a settable object in the computer program application;

register the change with a transaction;

dirty all objects dependent on the changed object;

sever dependencies from the changed object and all of its direct and indirect dependent objects; and whenever a leaf object is encountered as a dependent object, enqueue the leaf object for synchronization after the transaction is committed, wherein leaf object synchronization includes using a requester object to make the transaction consistent, the requester object operating to request an object's value so that the requested value cannot change until the requester terminates, at which time all objects whose values were requested by the requester object are released.

32. The product of claim 31, wherein leaf object synchronization comprises:

recomputing a value for each object marked as dirty, identifying the objects on which the recomputed value is actually dependent, and identifying the recomputed object as dependent only on the identified objects.

33. A computer program product, tangibly stored on a computer-readable medium, for changing objects defining state of a computer program application, the product comprising instructions operable to cause a computer to:

create a transaction and registering with the transaction one or more changes to settable objects, each change being made to a corresponding changing object;

traverse a dependency graph, for each change registered, from the changing object and (i) for each dependent object on the dependency graph, marking the dependent object as dirty and detaching the dependent object from the dependency graph, and (ii) accumulating each leaf object encountered in traversing the dependency graph in a strobe queue; and traverse the strobe queue after all changes to settable objects have been registered and synchronizing each leaf object by recomputing values for objects marked as dirty and rejoining recomputed objects with the dependency graph, whereby leaf objects are rejoined with the dependency graph, wherein the values for objects marked as dirty are recomputed using one or more requester objects, each requester object operating to request an object's value so that the requested value cannot change until the requester terminates, at which time all objects whose values were requested by the requester object are released.

34. The product of claim 33, wherein:

the dependency graph represents application state;

the roots of the dependency graph are the settable objects of the application state; and the intermediate nodes of the dependency graph are dependent objects whose values are the results of intermediate computations.

35. The product of claim 33, wherein:

the leaf objects of the dependency graph are coupled to a user interface.

36. The product of claim 35, wherein:

the leaf objects are coupled directly to the user interface.

* * * * *

UNITED STATES PATENT AND TRADEMARK OFFICE
CERTIFICATE OF CORRECTION

PATENT NO. : 7,464,383 B1 Page 1 of 1
APPLICATION NO. : 09/293737
DATED : December 9, 2008
INVENTOR(S) : Gordon B. Dow It is certified that error appears in the above-identified patent and that said Letters Patent is hereby corrected as shown below:

On the Cover Page - OTHER PUBLICATIONS under References Cited:
 right column, line 16:
  delete "www.obect-artscom/", and replace with --www.object-arts.com-- right column, line 18:
  delete "www.obect-artscom/", and replace with --www.object-arts.com-- right column, line 20:
  delete "www.obect-artscom/", and replace with --www.object-arts.com--

Page 2 - OTHER PUBLICATIONS:
 right column, line 4:
  delete "http://atddoc. cern.ch/Atlas/", and insert
  --http://atddoc.cern.ch/Atlas/--

Claim 13:
 column 19, line 10:
  insert --,-- after "object"

Signed and Sealed this

Twenty-fourth Day of March, 2009

JOHN DOLL
*Acting Director of the United States Patent and Trademark Office*